United States Patent
Petr et al.

(10) Patent No.: US 11,584,818 B2
(45) Date of Patent: Feb. 21, 2023

(54) PROCESSING AID FOR FOAM MOLDING, A VINYL CHLORIDE RESIN-BASED FOAM MOLDING COMPOSITION COMPRISING THE SAME AND A FOAM MOLDED PRODUCT

(71) Applicant: Rohm and Haas Company, Philadephia, PA (US)

(72) Inventors: Michael T. Petr, Collegeville, PA (US); Paul R. Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/753,555

(22) PCT Filed: Aug. 31, 2016

(86) PCT No.: PCT/US2016/049721
§ 371 (c)(1),
(2) Date: Feb. 20, 2018

(87) PCT Pub. No.: WO2017/040679
PCT Pub. Date: Mar. 9, 2017

(65) Prior Publication Data
US 2018/0258246 A1    Sep. 13, 2018

Related U.S. Application Data

(60) Provisional application No. 62/212,156, filed on Aug. 31, 2015.

(51) Int. Cl.
*C08J 9/00* (2006.01)
*C08F 220/18* (2006.01)
*C08L 27/06* (2006.01)
*C08F 220/14* (2006.01)
*C08L 33/12* (2006.01)

(52) U.S. Cl.
CPC ...... *C08F 220/1804* (2020.02); *C08F 220/14* (2013.01); *C08J 9/0061* (2013.01); *C08L 27/06* (2013.01); *C08L 33/12* (2013.01); *C08J 2201/03* (2013.01); *C08J 2327/06* (2013.01); *C08J 2433/10* (2013.01); *C08L 2203/14* (2013.01)

(58) Field of Classification Search
CPC ...... C08L 27/06; C08L 33/12; C08L 2203/14; C08J 2201/03; C08J 2327/06; C08J 9/228
See application file for complete search history.

(56) References Cited

U.S. PATENT DOCUMENTS

| | | | |
|---|---|---|---|
| 6,043,293 A | 3/2000 | Belik et al. | |
| 6,348,512 B1* | 2/2002 | Adriani | C08J 9/0014 |
| | | | 521/134 |
| 6,391,976 B1* | 5/2002 | Naka | C08F 220/14 |
| | | | 525/239 |
| 6,723,762 B1* | 4/2004 | Sunagawa | C08F 259/04 |
| | | | 521/134 |
| 6,730,741 B1* | 5/2004 | Honda | C08L 27/06 |
| | | | 525/228 |
| 2012/0189837 A1* | 7/2012 | Lavallee | C08L 27/24 |
| | | | 428/304.4 |
| 2014/0371396 A1* | 12/2014 | Van Rheenen | C08L 27/00 |
| | | | 525/220 |
| 2015/0183944 A1 | 7/2015 | Guo et al. | |
| 2016/0247597 A1* | 8/2016 | Kuwahara | H01B 3/443 |

FOREIGN PATENT DOCUMENTS

| | | |
|---|---|---|
| GB | 1069848 | 5/1967 |
| JP | 2813248 | * 10/1998 |
| JP | 2012-140638 A | 7/2012 |
| WO | WO99/43741 | 2/1999 |
| WO | WO 2010/061630 | 6/2010 |
| WO | WO 2013/095876 | 6/2013 |
| WO | WO 2013100997 | * 7/2013 |
| WO | WO 2015/045928 | 4/2015 |
| WO | WO 2015/045930 | 4/2015 |

OTHER PUBLICATIONS

PCT Search Report dated Oct. 10, 2016; from counterpart PCT Application No. PCT/US2016/049721.
PCT IPRP dated Mar. 15, 2018; from counterpart PCT Application No. PCT/US2016/049721.
EP Office Action; from counterpart EP Application No. 16766731.0.
Chinese Office Action; from counterpart Chinese Application No. 201680048218.1.

* cited by examiner

Primary Examiner — Gregory Listvoyb

(57) ABSTRACT

A processing aid for foam molding comprising a copolymer obtained by the polymerization of 30 to 90% by weight of methyl methacrylate, 10 to 70% by weight total of one or more monomers selected from the group consisting of butyl methacrylate (BMA), pentyl methacrylate (PMA) and hexyl methacrylate (HMA), and 0 to 20% by weight of other copolymerizable monomers, the copolymer having a reduced viscosity measured according to ASTM D2857 at 1 mg/mL in chloroform at 25° C. of greater than 8 dL/g is provided.

3 Claims, No Drawings

PROCESSING AID FOR FOAM MOLDING, A VINYL CHLORIDE RESIN-BASED FOAM MOLDING COMPOSITION COMPRISING THE SAME AND A FOAM MOLDED PRODUCT

FIELD OF INVENTION

This invention relates to a processing aid for foam molding, a process for foam molding using the processing aid, a vinyl chloride resin-based foam molding composition comprising the processing aid, and a foam molded product.

BACKGROUND OF THE INVENTION

In the building and construction industry, poly(vinyl chloride) (PVC) is often used in a foamed form. The foam is produced by formulation with a chemical blowing agent and a high molecular weight process aid. During extrusion, the blowing agent decomposes producing a gas dissolved in the high pressure PVC melt. As it exits the die and the pressure drops, the gas forms bubbles that expand the PVC two to three times its original volume. At this point, the PVC bubbles collapse, so the high molecular weight process aid is added to increase the melt viscosity and provide entanglements to prevent the PVC melt from relaxing as well as to provide extra die swell and further foam expansion. Commercial foam process aids are extremely high molecular weight, usually 1-20 Mg/mol, poly(methyl methacrylate) copolymers with up to 30% of other polyacrylics.

There are three main variables that affect the efficiency of foam process aids: molecular weight, molecular architecture, and glass transition temperature ($T_g$). In general, higher molecular weight produces higher foam expansion because it has a higher melt viscosity and provides more entanglements, and less branching and crosslinking produces higher foam expansion because the polymer can better mix into the PVC. On the other hand, there appears to be an optimum $T_g$ to both provide a high melt viscosity but still be able to disentangle during extrusion. Typically, to provide these properties 15-20% total of either/both ethyl acrylate (EA) or butyl acrylate (BA) are used. With either EA or BA, the resulting copolymer has a lower molecular weight than any of the constituent homopolymers because the cross-propagation of MMA to EA or BA is very slow. BA promotes significant crosslinking because of the tertiary hydrogens in the backbone of the polymer are susceptible to abstraction. Therefore, improved foaming aids are still desired in the field.

SUMMARY OF THE INVENTION

In a first embodiment, the disclosure provides a processing aid for foam molding comprising a copolymer obtained by the polymerization of 30 to 90% by weight of methyl methacrylate, 10 to 70% by weight total of one or more monomers selected from the group consisting of butyl methacrylate (BMA), pentyl methacrylate (PMA) and hexyl methacrylate (HMA), and 0 to 20% by weight of other copolymerizable monomers, the copolymer having a reduced viscosity measured according to ASTM D2857 at 1 mg/mL in chloroform at 25° C. of greater than 8 dL/g.

In a second embodiment, the disclosure provides a vinyl chloride resin-based foam molding composition comprising 100 parts by weight of a vinyl chloride resin and 1 to 25 parts by weight of a processing aid for foam molding use according to any embodiment disclosed herein.

In a third embodiment, the disclosure provides a foam molded product formed from a vinyl chloride resin-based foam molding composition according to any embodiment disclosed herein.

DETAILED DESCRIPTION OF THE INVENTION

The processing aid for foam molding according to the disclosure comprises a copolymer obtained by the polymerization of 30 to 90% by weight (wt %) of methyl methacrylate. All individual values and subranges from 30 to 90 wt % methyl methacrylate are included and disclosed herein; for example, the amount of units derived from methyl methacrylate can range from a lower limit of 30, 35, 40, 45, 50, 55, 60, 65, 75 or 80 wt % to an upper limit of 35, 40, 45, 50, 55, 60, 65, 70, 80 or 90 wt %. For example, the amount of units derived from methyl methacrylate can range from 30 to 90 wt %, or in the alternative, from 30 to 55 wt %, or in the alternative from 55 to 70 wt %, or in the alternative from 40 to 60 wt %.

The processing aid for foam molding according to the disclosure comprises a copolymer obtained by the polymerization of 10 to 70% by weight total of one or more monomers selected from the group consisting of butyl methacrylate (BMA), pentyl methacrylate (PMA) and hexyl methacrylate (HMA). All individual values and subranges from 10 to 70 wt % are included and disclosed herein; for example, the amount of units derived from one or more of BMA, PMA and HMA can range from a lower limit of 10, 15, 20, 25, 30, 35, 40, 45, 50, or 55 wt % to an upper limit of 20, 25, 30, 35, 40, 45, 50, 55, 60, 65 or 70 wt %. For example, the amount of units derived from one or more of BMA, PMA and HMA can range from 10 to 70 wt %, or in the alternative, from 15 to 42 wt %, or in the alternative from 37 to 70 wt %, or in the alternative from 25 to 50 wt %.

In a particular embodiment, the one or more monomers is BMA.

In a particular embodiment, the one or more monomers is PMA.

In a particular embodiment, the one or more monomers is HMA.

In another embodiment, the disclosure provides a processing aid for foam molding consisting of a copolymer obtained by the polymerization of 30 to 70% by weight of methyl methacrylate, 15 to 70% by weight total of one or more monomers selected from the group consisting of butyl methacrylate (BMA), pentyl methacrylate (PMA) and hexyl methacrylate (HMA), and 0 to 20% by weight of other copolymerizable monomers, the copolymer having a reduced viscosity measured according to ASTM D2857 at 1 mg/mL in chloroform at 25° C. of greater than 8 dL/g.

In another embodiment, the disclosure provides a processing aid for foam molding consisting essentially of a copolymer obtained by the polymerization of 30 to 90% by weight of methyl methacrylate, 10 to 70% by weight total of one or more monomers selected from the group consisting of butyl methacrylate (BMA), pentyl methacrylate (PMA) and hexyl methacrylate (HMA), and 0 to 20% by weight of other copolymerizable monomers, the copolymer having a reduced viscosity measured according to ASTM D2857 at 1 mg/mL in chloroform at 25° C. of greater than 8 dL/g.

The processing aid for foam molding according to the disclosure comprises a copolymer obtained by the polymerization of 0 to 20% by weight of other copolymerizable monomers. All individual values and subranges from 0 to 20 wt % are included and disclosed herein; for example, the amount of units derived from other copolymerizable monomers can range from a lower limit of 0, 5, 10, or 15 wt % to an upper limit of 5, 10, 15, or 20 wt %. For example, the amount of units derived from other copolymerizable monomers can range from 0 to 20 wt %, or in the alternative, from 0 to 10 wt %, or in the alternative from 10 to 20 wt %, or in the alternative from 5 to 15 wt %.

The other copolymerizable monomers include any monomer which may be copolymerized with methacrylates. Such monomers include, for example, acrylates, methacrylates, crosslinking agents and graftlinking agents. Exemplary monomers include, methyl acrylate, ethyl acrylate, propyl acrylate, butyl acrylate, ethylhexyl acrylate (EHA), octyl acrylate, ethyl methacrylate, propyl methacrylate, butyl methacrylate, pentyl methacrylate, hexyl methacrylate, ethylhexyl methacrylate (EHMA), octyl methacrylate, styrene, vinyl acetate, acetoacetoxyethyl methacrylate, acrylic acid, methacrylic acid, acrylamide, methacrylamide, glycidyl methacrylate, maleic anhydride.

The resulting processing aid for foam molding exhibits a reduced viscosity measured according to ASTM D2857 at 1 mg/mL in chloroform at 25° C. of greater than 8 dL/g. All individual values and subranges from greater than 8 dl/g are included and disclosed herein. For example, the processing aid for foam molding may exhibit a reduced viscosity of greater than 8 dL/g, or in the alternative, greater than 9 dL/g, or in the alternative, greater than 10 dL/g, or in the alternative, greater than 11 dL/g, or in the alternative, greater than 14 dL/g, or in the alternative, greater than 17 dL/g.

The processing aid for foam molding may be made using any known emulsion polymerization method.

The most common extrusion practices involve free foaming out of the die followed by some type of calibration and the Celuka or integrated skin process. A description of these PVC foaming processes and typical formulation ingredients can be found in the Handbook of Polymeric Foams and Foam Technology, Ed. Klemper, D., Sendijarevic, V., 2.sup.nd edition, Hanser Publishers, Munich, 2004 chapter 9.

In an alternative embodiment, the processing aid for foam molding is made using a multi-stage emulsion polymerization process. Such processes are disclosed in U.S. Patent Application Publications 2015/0183944 and 2014/0371396, the disclosures of which are incorporated herein by reference.

The processing aids for foam molding are typically isolated to form a free-flowing powder or pellets, the powder particles having a 50-500 micron mean diameter.

The vinyl chloride resin-based foam molding composition disclosed herein comprises 100 parts by weight of a vinyl chloride resin and 1 to 25 parts by weight of the processing aid for foam molding use according to any embodiment disclosed herein. All individual values and subranges from 1 to 25 parts by weight of the processing aid are disclosed and included herein; for example, the amount of processing aid in the vinyl chloride-based foam molding composition can range from a lower limit of 1, 3, 6, 9, 12, 15 or 18 parts by weight to an upper limit of 2, 5, 8, 11, 14, 17 or 20 parts by weight. For example, the amount of processing aid in the vinyl chloride-based foam molding composition may be from 1 to 25 parts by weight, or in the alternative, from 1 to 12 parts by weight, or in the alternative, from 12 to 25 parts by weight, or in the alternative, from 8 to 18 parts by weight.

In an alternative embodiment, the vinyl chloride resin-based foam molding composition may comprise one or more additives selected from the group consisting of thermal stabilizers, lubricants, impact modifiers, fillers, colors, and other processing aids.

The disclosure further provides a foam molded product formed from a vinyl chloride resin-based foam molding composition according to any embodiment disclosed herein.

In a particular embodiment, the foam molded product is a foamed structural component.

In an alternative embodiment, the disclosure provides a processing aid for foam molding, vinyl chloride resin-based foam molding composition and a foam molded product according to any embodiment disclosed herein except that the copolymer is obtained by polymerization of 60 to 70% by weight of methyl methacrylate and 30 to 40% by weight of butyl methacrylate in the absence of any other copolymerizable monomers.

In an alternative embodiment, the disclosure provides a processing aid for foam molding, vinyl chloride resin-based foam molding composition and a foam molded product according to any embodiment disclosed herein except that the vinyl chloride resin-based foam molding composition exhibits a foam expansion of equal to or greater than 130%. All individual values and subranges from equal to or greater than 130% are included and disclosed herein. For example, the vinyl chloride resin-based foam molding composition may exhibit a foam expansion of equal to or greater than 130%, or in the alternative, equal to or greater than 132%, or in the alternative, equal to or greater than 135%, or in the alternative, equal to or greater than 138%.

The disclosure further provides a process for foam molding a vinyl chloride resin comprising extruding a vinyl chloride resin-based foam molding composition which comprises 100 parts by weight of a vinyl chloride resin and 1 to 25 parts by weight of a processing aid according to any embodiment disclosed herein.

EXAMPLES

The following examples illustrate the present invention but are not intended to limit the scope of the invention.

All examples were prepared as follows using the various monomer compositions in Table 1.

Emulsion polymerization was used to make the foam process aids. An emulsion of monomers, DOWFAX 2A1, and water was mixed and added to a reaction flask. After inerting the contents, polymerization was initiated with a sodium formaldehyde sulfoxylate and sodium persulfate redox initiator system catalyzed by an iron salt. Upon completion of the polymerization, the latex was cooled and dried. DOWFAX 2A1 is an alkyldiphenyloxide disulfonate surfactant which is commercially available from The Dow Chemical Company (Midland, Mich., USA).

The processing aids for foam molding, Comparative Examples 1-5 and Inventive Examples 1-11, were used in foam molding a polyvinyl chloride resin as described in PCT Publication WO 2013/095876, the disclosure of which is incorporated herein by reference in its entirety. The processing aids were added at a level of 7.2 phr. PCT Publication WO 2013/095876 further describes the method for measuring the foam expansion used herein. Table 1 further provides the foam expansion results for each of the example processing aids. Reduced viscosity is measured according to ASTM D2857 at 1 mg/mL in chloroform at 25° C. Table 2 provides the reduced viscosity measurements for certain Inventive and Comparative Examples.

TABLE 1

Example monomer compositions and foam expansions.

| Example ID | Composition | Foam Expansion |
| --- | --- | --- |
| Inventive Example 1 | 82% MMA 18% BMA | 131% |
| Inventive Example 2 | 78% MMA 22% BMA | 134% |
| Inventive Example 3 | 70% MMA 30% BMA | 144% |
| Inventive Example 4 | 60% MMA 40% BMA | 150% |
| Inventive Example 5 | 54% MMA 46% BMA | 145% |
| Inventive Example 6 | 40% MMA 60% BMA | 149% |
| Inventive Example 7 | 69% MMA 31% HMA | 140% |
| Inventive Example 8 | 59% MMA 38% BMA 3% BA | 137% |
| Inventive Example 9 | 63% MMA 31% BMA 6% BA | 141% |
| Inventive Example 10 | 68% MMA 23% BMA 9% BA | 139% |
| Inventive Example 11 | 73% MMA 15% BMA 12% BA | 138% |
| Comparative Example 1 | 82% MMA 18% BA | 128% |
| Comparative Example 2 | 82% MMA 18% EA | 134% |
| Comparative Example 3 | 83.5% MMA 4.9% BA 11.6% EA | 138% |
| Comparative Example 4 | 84% MMA 16% EHA | 116% |
| Comparative Example 5 | 72% MMA 28% ERMA | 132% |

TABLE 2

Example monomer compositions and reduced viscosities.

| Example ID | Composition | Reduced Viscosity (dL/g) |
| --- | --- | --- |
| Inventive Example 1 | 82% MMA 18% BMA | 22.77 |
| Inventive Example 3 | 70% MMA 30% BMA | 17.51 |
| Inventive Example 4 | 60% MMA 40% BMA | 19.13 |
| Inventive Example 5 | 54% MMA 46% BMA | 18.10 |
| Inventive Example 6 | 40% MMA 60% BMA | 20.20 |
| Inventive Example 7 | 69% MMA 31% HMA | 19.10 |
| Inventive Example 8 | 59% MMA 38% BMA 3% BA | 19.04 |
| Inventive Example 11 | 73% MMA 15% BMA 12% BA | 15.28 |
| Comparative Example 1 | 82% MMA 18% BA | 14.20 |
| Comparative Example 2 | 82% MMA 18% EA | 18.90 |
| Comparative Example 5 | 72% MMA 28% EHMA | 17.17 |

We claim:

1. A vinyl chloride resin-based foam molding composition comprising 100 parts by weight of a vinyl chloride resin and 1 to 25 parts by weight of a processing aid for foam molding use consisting of a copolymer obtained by the polymerization of 40% by weight of methyl methacrylate, 60% by weight butyl methacrylate, the copolymer having a reduced viscosity measured according to ASTM D2857 at 1 mg/mL in chloroform at 25° C. of greater than 19 dL/g, wherein the processing aid is in the form of free-flowing powder having a particle size from 50 to 500 microns; wherein the composition exhibits a foam expansion of equal to or greater than 145%.

2. A foam molded product formed from a vinyl chloride resin-based foam molding composition according to claim 1.

3. The foam molded product according to claim 2, wherein the product is a foamed structural component.

* * * * *